United States Patent
Kratochwil et al.

(10) Patent No.: US 7,406,028 B2
(45) Date of Patent: Jul. 29, 2008

(54) MEMORY-EFFICIENT ADSL TRANSMISSION IN THE PRESENCE OF TCM-ISDN INTERFERERS

(75) Inventors: Konrad W. Kratochwil, Menlo Park, CA (US); Thomas N. Zogakis, Mountain View, CA (US); Peter J. Melsa, Niles, MI (US)

(73) Assignee: Texas Instruments Incorporated, Dallas, TX (US)

(*) Notice: Subject to any disclaimer, the term of this patent is extended or adjusted under 35 U.S.C. 154(b) by 1111 days.

(21) Appl. No.: 10/342,059

(22) Filed: Jan. 14, 2003

(65) Prior Publication Data

US 2003/0227865 A1    Dec. 11, 2003

Related U.S. Application Data (60) Provisional application No. 60/386,524, filed on Jun. 5, 2002.

(51) Int. Cl.
    *H04J 1/12*    (2006.01)
(52) U.S. Cl. .................. 370/201; 370/286; 370/463; 379/406.06; 375/222
(58) Field of Classification Search .............. 370/264, 370/904, 364
    See application file for complete search history.

(56) References Cited

U.S. PATENT DOCUMENTS

| | | | | |
|---|---|---|---|---|
| 6,055,268 A * | 4/2000 | Timm et al. ............ | 375/229 |
| 6,069,922 A * | 5/2000 | Dyke .................... | 375/285 |
| 6,266,347 B1 * | 7/2001 | Amrany et al. ........ | 370/478 |
| 6,317,495 B1 * | 11/2001 | Gaikwad et al. ....... | 379/417 |
| 6,510,184 B1 * | 1/2003 | Okamura ............... | 375/260 |
| 6,580,752 B1 * | 6/2003 | Amrany et al. ........ | 375/225 |
| 6,628,704 B1 * | 9/2003 | Long et al. ............ | 375/219 |
| 6,747,992 B1 * | 6/2004 | Matsumoto ............ | 370/468 |
| 6,804,267 B1 * | 10/2004 | Long et al. ............ | 370/524 |
| 6,965,649 B1 * | 11/2005 | Miyoshi et al. ........ | 375/259 |

(Continued)

FOREIGN PATENT DOCUMENTS

EP    0 961 449 A    12/1999

(Continued)

OTHER PUBLICATIONS

XP-000869790, Jan. 1999, Okamura, vol. 40, 64-69.

(Continued)

*Primary Examiner*—Chi H. Pham
*Assistant Examiner*—Thai D. Hoang
(74) *Attorney, Agent, or Firm*—Steven A. Shaw; W. James Brady; Frederick J. Telecky, Jr.

(57) ABSTRACT

A method of communicating data across a channel that experiences near-end cross talk (NEXT) interference and far-end cross talk (FEXT) interference in alternate intervals. In one embodiment, the method comprises: a) determining $N_F$, the number of bits per symbol usable in a FEXT-only mode of operation; b) determining $N_S$, a number of bits per symbol usable in a single mode of operation; c) determining whether the FEXT-only mode or the single mode provides a higher data rate; and d) configuring a modem to transmit using the mode having a higher data rate. The FEXT-only mode may be determined to have a higher data rate when $126N_F > 340N_S$.

23 Claims, 5 Drawing Sheets

U.S. PATENT DOCUMENTS

| | | | |
|---|---|---|---|
| 7,260,117 B2* | 8/2007 | Long et al. | 370/503 |
| 2001/0031016 A1* | 10/2001 | Seagraves | 375/264 |
| 2002/0090039 A1* | 7/2002 | Koizumi et al. | 375/316 |
| 2002/0123350 A1* | 9/2002 | Bui | 455/450 |
| 2003/0189952 A1* | 10/2003 | Long et al. | 370/503 |
| 2004/0258000 A1* | 12/2004 | Kamali et al. | 370/252 |

FOREIGN PATENT DOCUMENTS

| | | |
|---|---|---|
| WO | WO 00 35133 A | 6/2000 |

OTHER PUBLICATIONS

*Series G: Transmission Systems And Media, Digital Systems And Networks*, ITU-T, G.992.1, International Telecommunication Union, Jun. 1999 (64 p.).

* cited by examiner

MEMORY-EFFICIENT ADSL TRANSMISSION IN THE PRESENCE OF TCM-ISDN INTERFERERS

CROSS-REFERENCE TO RELATED APPLICATION

The present application claims priority to U.S. provisional patent application Ser. No. 60/386,524, filed Jun. 5, 2002, and entitled "Method and Apparatus for Efficient ADSL Data Transmission in a Time Varying Noise Environment", hereby incorporated herein by reference.

BACKGROUND

Telephone companies offer customers a number of ways to transport data. One popular way is called Asymmetric Digital Subscriber Line (ADSL). In ADSL, a small portion of the frequency spectrum is used for communicating data from the customer to the central office, and a much larger portion of the frequency spectrum is used for communicating data from the central office to the customer.

Discrete multi-tone (DMT) modulation is used within each portion of the frequency spectrum, i.e., data are carried on equally-spaced carrier signals. The combined number of carrier signals from both portions of the spectrum is implementation-dependent. ADSL implementations that comply with the ITU-T G.992.1 standard have 256 carrier signals, while implementations that comply with the ITU-T G.992.2 standard have 128 carrier signals. Future implementations are expected to have 512 or even 1024 carrier signals (see, e.g., ITU-T G.992.5).

DMT modulation provides for very efficient use of the available communication spectrum because the amount of data carried by each carrier signal is individually customized to fit the signal-to-noise ratio profile of the channel. Each carrier signal is allocated a number of data bits, and the allocation of bits may be dynamically adjusted as channel conditions change. Each carrier signal may also be allocated a small individual gain factor to further improve communications performance.

The allocation of bits and gain factors to carrier signals are typically performed using tables. A gain table includes an individual gain factor for each carrier signal. A bit table includes an individual number of bits allocated to each carrier signal. A tone table may be used to allocate specific data bits to specific carrier signals.

Some channels actually have two signal-to-noise ratio profiles. An example of such a channel is a twisted wire pair in a binder that also carries TCM-ISDN (Time Compression Multiplexing—Integrated Services Digital Network) traffic. TCM-ISDN employs time division multiplexing at a rate of 400 Hz, i.e. the central office alternately transmits data for 1.25 milliseconds, then listens for data from the customer for 1.25 milliseconds. This causes other channels to experience a noise profile that alternates at a rate of 400 Hz.

The interference can be divided into two types: near-end cross talk (NEXT) and far-end cross talk (FEXT). Some confusion can arise when discussing NEXT and FEXT since the meaning of NEXT and FEXT changes with respect to the chosen reference point. For clarity herein, the central office is hereby chosen as the arbitrary reference point, and this reference point will be used consistently throughout. NEXT interference on a given channel is caused by central office transmissions on other channels. FEXT interference on a given channel is caused by transmissions from customers on other channels. TCM-ISDN signaling alternately causes NEXT interference and FEXT interference. The NEXT interference is generally significantly worse than the FEXT interference, although this depends on the distance that the twisted wire pair travels alongside interfering channels.

The ITU-T G.992.1 and G.992.2 standards each address TCM-ISDN interference in their respective Annex C. Two solutions are offered: dual mode solution and FEXT-only solution. In the dual mode solution, two sets of tables (gain, bit, and tone) are used. One set of tables is used to construct symbols for transmission during periods of NEXT interference ("NEXT symbols"), and the other set of tables is used to construct symbols for transmission during periods of FEXT interference ("FEXT symbols"). Although TCM-ISDN signaling uses a 50% duty cycle, it is expected that on average, only 126/340 (about 37%) of the symbols will be free of NEXT interference, and hence constructible as FEXT symbols.

Although the dual mode solution offers a higher data rate, it does add significant cost to the modem in the form of additional memory for the second set of tables. This additional cost is expected to be significant for future ADSL implementations having 512 or more carrier signals due to the increased size of the tables.

The FEXT-only solution is similar to the dual mode solution except that no symbols are constructed or sent during the periods of NEXT interference. Because only FEXT symbols are used, only one set of tables is needed. Although the FEXT symbols typically carry more data than NEXT symbols, sacrificing 63% of the symbols can impose a substantial performance penalty.

Accordingly, it would be desirable to have a memory-efficient method for ADSL transmission in a time-varying noise environment. Such a method would preferably avoid the performance penalty of the FEXT-only solution without suffering the prohibitive expense of the dual mode solution.

SUMMARY

Accordingly, there is disclosed herein a method of communicating data across a channel that experiences near-end cross talk (NEXT) interference and far-end cross talk (FEXT) interference in alternate intervals. In one embodiment, the method comprises: a) determining NF, the number of bits per symbol usable in a FEXT-only mode of operation; b) determining $N_S$, a number of bits per symbol usable in a single mode of operation; c) determining whether the FEXT-only mode or the single mode provides a higher data rate; and d) configuring a modem to transmit using the mode having a higher data rate. The FEXT-only mode may be determined to have a higher data rate when $126N_F>340N_S$.

In another embodiment, the method comprises: a) performing a bit table determination procedure for FEXT symbols; b) performing a bit table determination procedure for NEXT symbols; and c) constructing a bit table for single mode symbols. The single mode bit table may be constructed by setting each single mode bit table entry equal to the lesser of the corresponding entries in a FEXT symbol bit table and a NEXT symbol bit table. The number of bits per symbol usable in the FEXT-only mode may be determined by summing entries from the FEXT-only symbol bit table, and the number of bits usable in the single mode may be determined by summing entries from the single mode symbol bit table.

In yet another embodiment, the method comprises: a first modem determining that FEXT-only mode or single mode is preferred communication mode; a second modem determining that FEXT-only mode or single mode is a preferred communication mode; and each modem transmitting using the preferred communication mode of the other modem. The preferred communication modes may be different.

Also contemplated is a modem that comprises: a memory and a processor. The memory is configured to store a single bit table. The processor is configured to transmit and receive data via a channel that experiences alternate intervals of NEXT and FEXT interference. The processor determines the number of bits per symbol usable in FEXT-only mode and single mode, and stores in memory the bit table for the mode offering the higher data rate.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
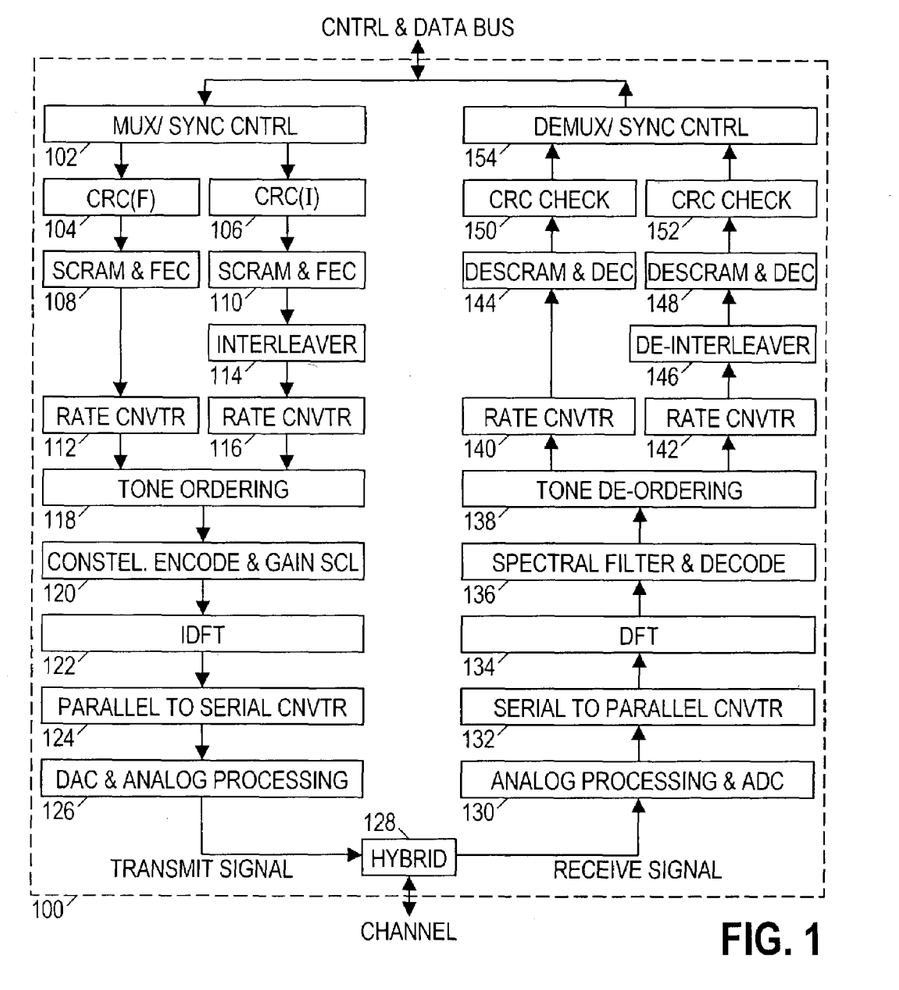
FIG. 1 is a functional-block diagram of one ADSL modem embodiment.

Turning now to the figures, you will find a functional block diagram of one embodiment of an ADSL ("Asymmetric Digital Subscriber Line") modem 100 in FIG. 1. A control and data bus conveys to modem 100 data that is to be transmitted. A multiplexer/synchronization controller 102 routes the data via two paths: a fast path, and an interleaved path. Data that needs to be sent with a low latency is routed through the fast path, while data that needs to be sent with a low error rate is routed through the interleaved path. The two data types may be intermixed and identified by a bus protocol.

The fast path data is delivered to CRC (cyclic redundancy code) block 104, which aligns the data into frames and appends a CRC checksum value. The interleaved path data is delivered to an independent CRC block 106 for the same processing. CRC blocks 104 and 106 forward the data frames to scrambling and forward error correction (FEC) blocks 108 and 110, respectively.

Blocks 108 and 110 each combine on a bit-wise basis the bits of the frame data with a pseudo-random bit sequence to randomize, or "scramble", the data. An error correction coding process is then applied to the randomized frame data to add redundancy. This redundancy may be used by the receiver to detect and correct errors caused by channel interference. In the fast path, block 108 provides the randomized and encoded data to rate converter block 112, while in the interleaved path, block 110 provides the randomized and encoded data to an interleaver block 114.

Interleaver block 114 re-orders the data in the stream of randomized and encoded data frames in a manner that interleaves the data from one frame among the data from other frames. By "spreading out" the data of a given frame in this manner, the modem provides increased resistance to "error bursts" on the channel. That is, a closely-spaced set of errors caused by channel interference will not be concentrated in the data of a single frame, but rather, the errors will be "scattered" at the receiver so that only one or two errors will appear in the data of a given frame. This prevents an error burst from overwhelming the error correction ability of the error correction code, however, it also introduces a significant latency in the travel time of the data. The stream of interleaved data is provided to rate converter block 116.

Rate converter blocks 112 and 116 may be buffers designed to "even out" the data rate required from the preceding blocks. The following blocks operate at two different data rates because the modem uses different data rates during periods of NEXT and FEXT interference.

A tone ordering block 118 retrieves data streams from the rate converter blocks 112, 116, and allocates bits from the data streams to outgoing carrier signals in accordance with a tone ordering table. It is generally preferred to allocate the bits in a manner that avoids having adjacent bits of the data stream carried on the same or adjacent carrier signals. Spreading out the bits in the frequency domain provides added resistance to interference that is localized in a given frequency region.

A constellation encoding and gain scaling block 120 receives the carrier-allocated bits from block 118 and converts them into amplitude values for the carriers. The conversion may be done in two steps: First the bits may be mapped to a quadrature amplitude modulation (QAM) constellation point, e.g. a four-bit value corresponds to a predetermined point in a 16-point QAM constellation. Second, the constellation point coordinates are multiplied by a gain value for the carrier signal to obtain the carrier signal amplitude.

Note that blocks 118 and 120 may rely on one or two sets of tone ordering, bit, and gain tables. A modem operating in the dual mode may employ two sets of tables, while a modem operating in a FEXT-only mode may employ just one set of tables.

An inverse Discrete Fourier Transform (IDFT) block 122 applies an inverse Discrete Fourier Transform to the carrier signal amplitudes to obtain one "symbol", that is, samples of a time domain signal having a frequency spectrum with the specified carrier signal amplitudes. Block 124 converts the symbol to serial form. The serial form of the symbol includes a cyclic prefix. The cyclic prefix is a copy of some number of samples from the end of the symbol, added as a prefix to the symbol. This prefix causes the convolution with the channel impulse response to mimic cyclical convolution, allowing for simpler equalization at the receiver.

Block 126 converts the sequence of symbols in serial form into an analog signal, which may then be filtered and amplified to form a transmit signal. The transmit signal is supplied via hybrid 128 to the channel, through which it travels to a receiver. A transmitter at the other end of the channel simultaneously transmits a signal for reception by modem 100.

The hybrid 128 operates to extract the receive signal from the channel while at the same time conveying a transmit signal to the channel. The hybrid may include one or more bandpass filters to prevent the transmit signal from interfering with the receive signal.

The receive signal from hybrid 128 may be equalized by block 130 and converted into digital form. Block 132 converts the sequence of symbols in serial form into symbols in parallel form, dropping the cyclic prefix. Block 134 applies a Discrete Fourier Transform (DFT) to the symbols, thereby determining amplitudes of carriers in the symbol. However, the amplitudes have been affected by transit through the channel.

Block 136 applies a spectral filter to the carrier amplitudes. A spectral filter is a gain factor for each carrier that compensates for channel attenuation and transmit gain table. Block 136 also maps the filtered carrier amplitudes to bits represented by the closest constellation points.

The detected bits are re-ordered by block 138 to put adjacent bits back together. Block 138 further segregates the bits into two bit streams, one for the fast path, and one for the interleaved path. The bit streams are provided to respective rate converter blocks 140, 142 to smooth the data rate for the ensuing blocks.

Note that blocks 136 and 138 may rely on one or two sets of filter, bit, and tone ordering tables to perform their functions. Two sets would be used when operating in dual mode, whereas only a single set would be needed when operating in FEXT-only mode.

The rate converter block 140 for the fast path provides a sequence of randomized and encoded data frames to block 144, while the rate converter block 142 for the interleaved path provides an interleaved data stream to block 146. Block 146 performs a de-interleaving process on the interleaved data stream to reconstruct a sequence of randomized and encoded data frames. The sequence is provided to block 148.

Blocks 144 and 148 perform an error correction ("decoding") process and a de-scrambling process on the randomized and encoded data frames. The decoding process identifies and corrects channel-induced errors in the data, dropping the previously-introduced redundancy in the process. The de-scrambling process again applies the pseudo-random bit sequence in a bit-wise fashion to undo the data randomization. Blocks 144 and 148 provide data frames to blocks 150 and 152, respectively.

Blocks 150, 152 perform a CRC checksum confirmation. If the CRC check fails, some form of error handling is carried out—typically a processor interrupt may be asserted by modem 100, thereby causing the processor to request that the data be re-transmitted. Assuming that the CRC check succeeds, the data is extracted from the frame structure and provided to block 154. Block 154 makes the data streams from the fast and interleaved data paths available to the system via the control and data bus.

Further details on the operation of the above-described embodiment of modem 100 are available in the ITU-T G.992.1 (06/99) standard, which is hereby incorporated by reference. Special reference should be made to Annex C of the standard.

Figure 2:
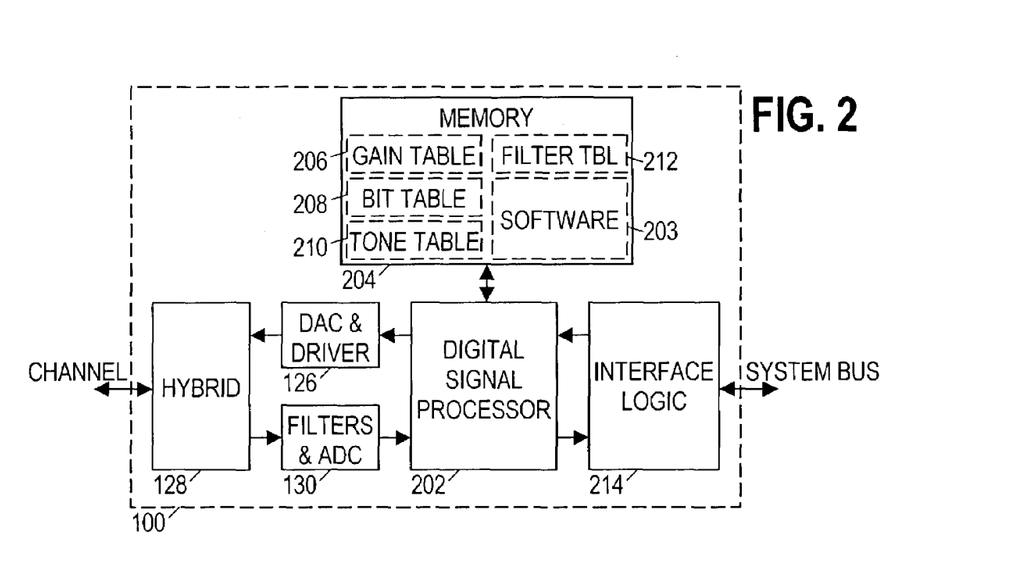
FIG. 2 is a schematic block diagram of the ADSL modem embodiment of FIG. 1.

FIG. 2 shows a preferred implementation of modem 100, in which many of the functional blocks are implemented by a digital signal processor (DSP) 202 that operates in accordance with software 203 stored in a memory 204. Memory 204 may also include one or two sets of tables, each set consisting of a gain table 206, a bit table 208, a tone table 210, and a filter table 212. The DSP 202 may be coupled to a system bus via interface logic 214.

The above-described embodiment of modem 100 operates in one of two modes: dual mode or FEXT-only mode. The operating mode may be determined by the capabilities of the modem on the other end of the channel. If the other modem supports dual mode, then dual mode will be used. Otherwise FEXT-only mode is used. The dual mode may support over twice the data rate of the FEXT-only mode on short loops. However, the increased cost to support the dual mode may be prohibitive due to the memory required for a second set of tables.

In a first preferred, alternative embodiment, the modem 100 may operate in one of two modes: single mode or FEXT-only mode. In the single mode, a single set of tables is used for constructing and decoding symbols sent during both NEXT- and FEXT-interference periods ("NEXT symbols" and "FEXT symbols", respectively). In the FEXT-only mode, a single set of tables is used for constructing and decoding symbols send during the FEXT-interference periods, and no symbols are sent during the NEXT interference periods. It is expected that this first preferred embodiment will nearly achieve the dual mode data rates at the same complexity as a modem that supports only the FEXT-only mode. The advantages of this embodiment will become more pronounced as future technologies support a greater number of carrier signals and require larger tables.

In a second preferred embodiment, the modem 100 may support different numbers of carrier signals (e.g. 256 in ADSL, and 512 in ADSL+). When operating at the higher number of carrier signals, the modem may support only those modes requiring a single set of tables, i.e. single mode and FEXT-only mode. However, when operating at the lower number of carrier signals (i.e., operationg in a reduced-carrier-number mode), the modem in the second preferred embodiment also supports modes requiring two sets of tables, i.e. the dual mode. The added flexibility of this embodiment is expected to enhance performance relative to the first preferred embodiment.

In the preferred embodiments, modem 100 will determine modes supported by the modem on the other end of the channel, and will avoid operating in modes not supported by the other modem. Hence, if the modem on the other end of the channel does not support single mode, modem 100 will operate in FEXT-only mode or dual mode (if supported). Assuming all modes are supported by the other modem, the software 203 causes the DSP 202 in the preferred modem embodiments to follow the appropriate setup procedure shown in FIG. 3A or 3B.

Figure 3A:
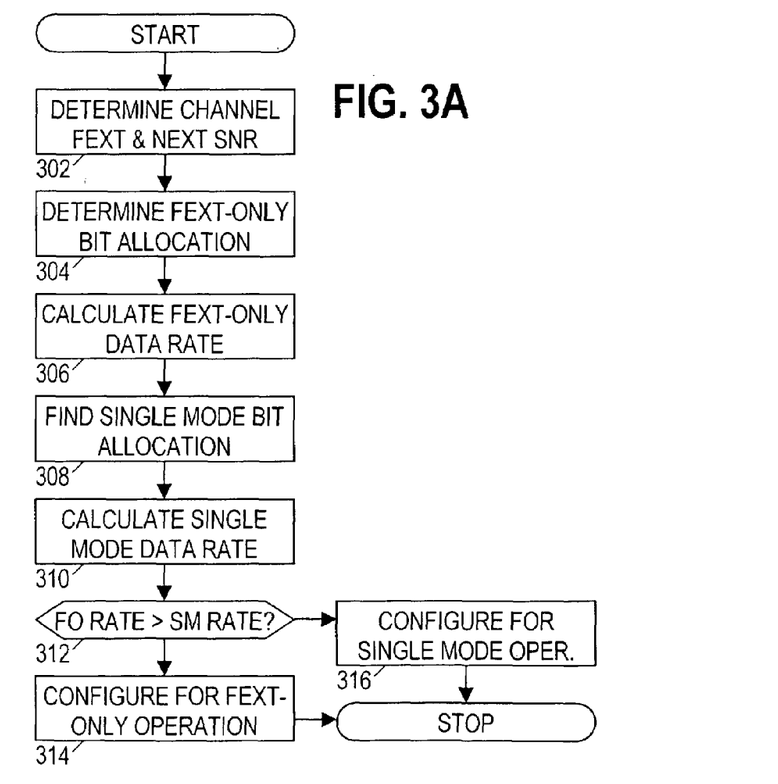
FIG. 3A is a flow diagram of a setup method of a preferred ADSL modem embodiment.

In block 302 of FIG. 3A, the modem characterizes the channel, identifying the signal-to-noise ratio profiles for both NEXT-interference periods and FEXT-interference periods. In block 304, the modem goes through the bit table (and possibly the gain table) determination procedure assuming operation in the FEXT-only mode. At least one result of block 304 is a calculation of $N_F$, the number of bits that would be carried by each FEXT symbol.

In block 306, the modem calculates an expected data rate for operation in the FEXT-only mode. The expected data rate may be determined exactly or an approximation may be used, since the exact data rate calculation may be too involved. The expected FEXT-only data rate ($R_{OF}$) may be calculated in accordance with the following expression:

$$R_{FO} = \left(\frac{N_F \text{ bits}}{\text{data symbol}}\right) \cdot \left(\frac{126}{340}\right) \cdot \left(\frac{4000 \text{ data symbols}}{\text{second}}\right), \qquad (1)$$

where 126/340 is the overall fraction of symbols that are free from NEXT-interference.

In block 308, the modem goes through the bit table (and possibly gain table) determination procedure assuming operation in the single mode. The bit table is determined from a combination of the bit tables for the NEXT and FEXT symbols, although it is expected to be unnecessary to completely determine the bit tables separately. The FEXT symbol bit table was determined in block 304. As the bit table for the NEXT symbols is determined, it is combined with the bit table for the FEXT symbols to determine the single mode bit table.

Recall that the bit table specifies the number of bits allocated to each carrier signal. The single mode bit table has for each carrier the lesser of the two numbers in the bit tables for the FEXT and NEXT symbols. Thus the number of bits for a given carrier in a NEXT symbol is compared to the number of bits for a given carrier in a FEXT symbol, and the smaller number is stored in the bit table for the single mode. At least one result of block 308 is a calculation of the $N_S$, number of bits that would be carried by each symbol.

Figure 3B:
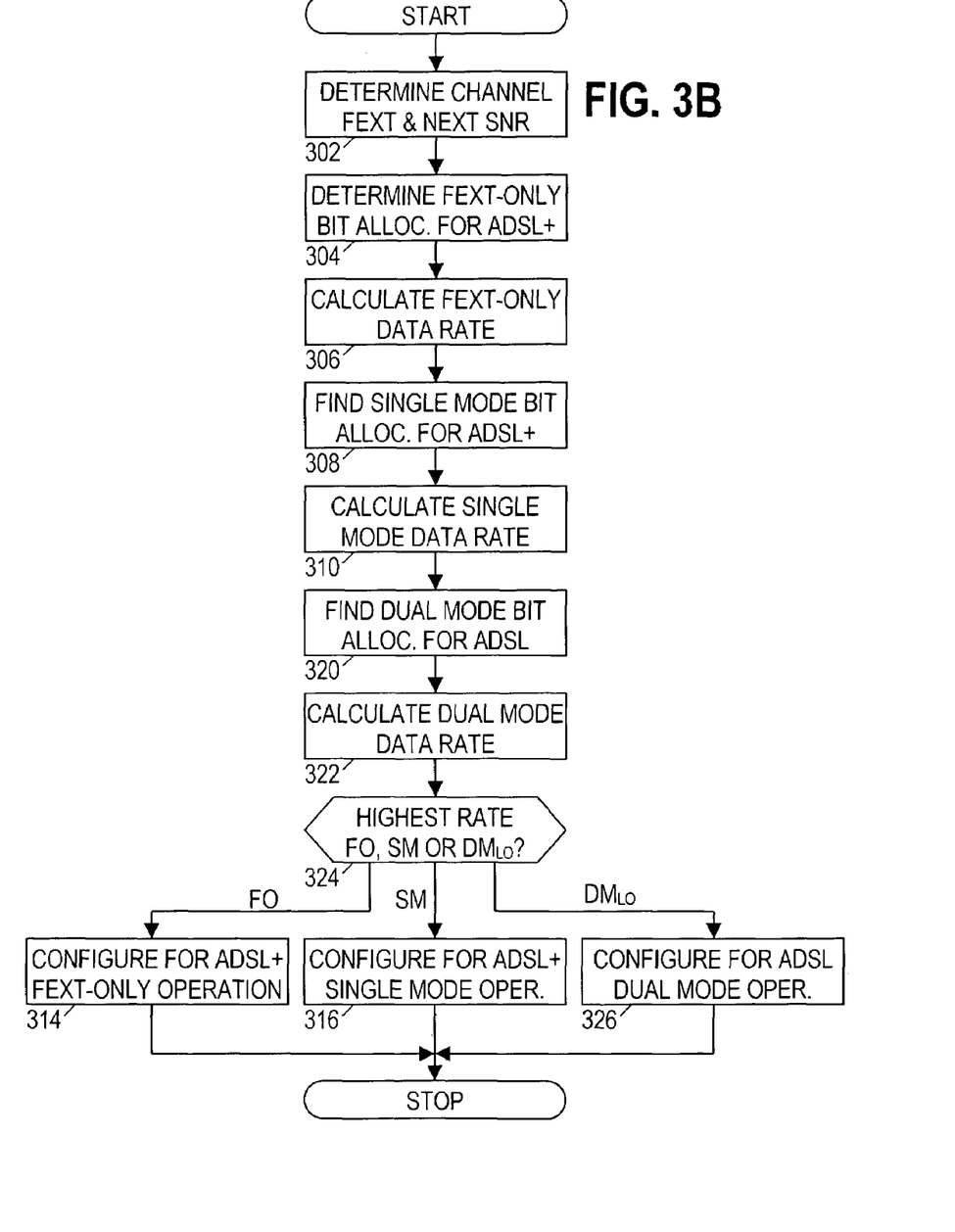
FIG. 3B is a flow diagram of a setup method of a preferred ADSL/ADSL+ modem embodiment.

512 carriers) and a reduced-carrier-number mode (e.g., ADSL using 256 carriers). In this procedure, the data rates for high carrier number FEXT-only mode ("OF"); high carrier number single mode (SM); and reduced-carrier-number mode (i.e., low carrier number dual mode ("$DM_{LO}$") are determined and compared. Thus in block 304, the OF bit allocation is determined and the number of bits per symbol $N_F$ is calculated. The data rate calculation of block 306 is unchanged. In block 308, the SM bit allocation is determined and the number of bits per symbol $N_S$ is calculated. Again the data rate calculation of block 310 is unchanged.

In block 320, the dual bit table allocation procedure is followed and the number of bits for FEXT symbols ($N_{F-LO}$) and the number of bits for NEXT symbols ($N_{N-LO}$) are determined. The data rate calculation in block 322 may take the following form:

$$R_{DM-LO} = \left[\left(\frac{N_{F-LO} \text{ bits}}{\text{data symbol}}\right)\cdot\left(\frac{126}{340}\right) + \left(\frac{N_{N-LO} \text{ bits}}{\text{data symbol}}\right)\cdot\left(\frac{214}{340}\right)\right]\cdot\left(\frac{4000 \text{ data symbol}}{\text{second}}\right), \quad (4)$$

If gain table calculations are also being performed at this stage, the gain factor for a given carrier is in accordance with the selected mode (i.e., FEXT-only mode or single mode). That is, if FEXT-only mode is chosen, the gain table is preferably computed for the bit table used in FEXT-only mode. If single mode is chosen, the gain table is computed for the bit table used in single mode.

In block 310, the modem calculates an expected data rate for operation in the single mode. As before, the expected data rate may be determined exactly or an approximation may be used. The expected single mode data rate (RSM) may be calculated in accordance with the following expression:

$$R_{SM} = \left(\frac{N_S \text{ bits}}{\text{data symbol}}\right)\cdot\left(\frac{4000 \text{ data symbols}}{\text{second}}\right). \quad (2)$$

In block 312, the modem compares the data rates for the two modes. In an alternative embodiment, blocks 306 and 310 may be omitted, and the equations (1) and (2) may be collapsed into a single comparison to determine whether:

$$126N_F > 340N_S \quad (3)$$

The modem makes a decision based on the outcome of the comparison. If the data rate for the FEXT-only mode is greater, then in block 314, the modem configures for FEXT-only operation. If the FEXT-only bit table has been overwritten, the modem may repeat the FEXT-only bit table determination. If the data rate for the single mode is greater, then in block 316, the modem configures for single mode operation.

Note that the operating mode is preferably determined by the receiving modem, so it is contemplated that modems at both ends of the channel perform this procedure. Note that the outcome may be different for each modem, so it is conceivable that one modem may be transmitting using the FEXT-only mode and receiving using the single mode.

The setup procedure shown in FIG. 3B is similar to that of FIG. 3A. However, in FIG. 3B, the procedure is extended to consider operation with different numbers of carriers. Such a circumstance may arise in a modem that supports both ADSL (256 carriers) and ADSL+(512 carriers). That is, a modem that supports a first carrier-number mode (e.g., ADSL+ using In block 324, the modem compares the data rates for the three modes. In an alternative embodiment, blocks 306, 310 and 322 may be omitted, and the equations (1) and (2) (as calculated for the high carrier number) may be collapsed with equation (4) into three-way comparison to determine which of the following is largest:

$$\max\{126N_F, 340N_S, (126N_{F-LO}+214N_{N-LO})\} \quad (5)$$

The modem makes a decision based on the outcome of the comparison. If the data rate for the OF+ mode is greater, then in block 314, the modem configures for OF operation. If the OF bit table has been overwritten, the modem may repeat the OF bit table determination. If the data rate for the SM mode is greater, then in block 316, the modem configures for SM operation. Again, if the SM bit table has been overwritten, the modem may repeat the SM bit table determination. Finally, if the $DM_{LO}$ mode has the largest data rate, then in block 326, the modem configures for $DM_{LO}$ operation.

Figure 4:
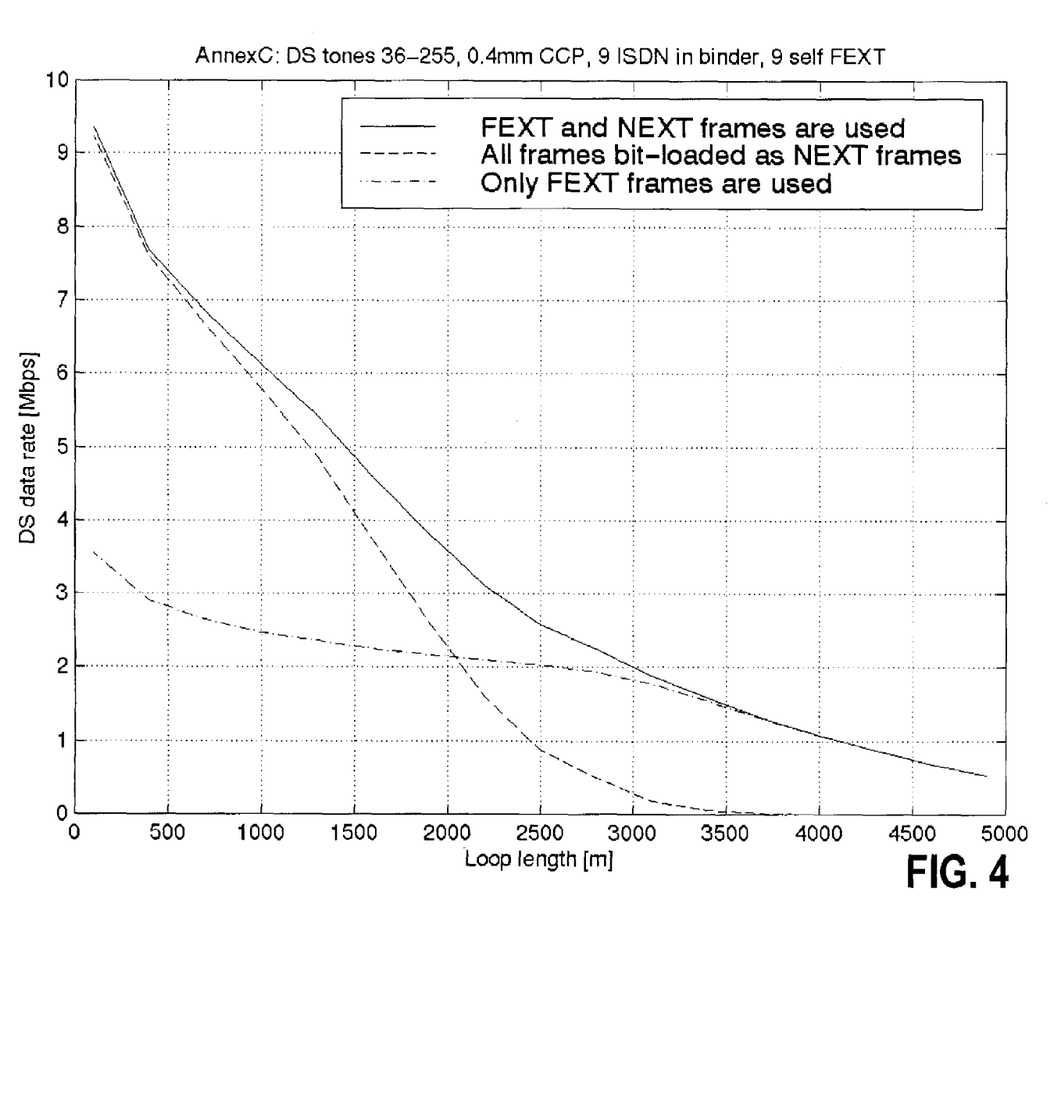
FIG. 4 is a graph showing relative data rates of different downlink communication modes on a time-varying noise channel.
Figure 5:
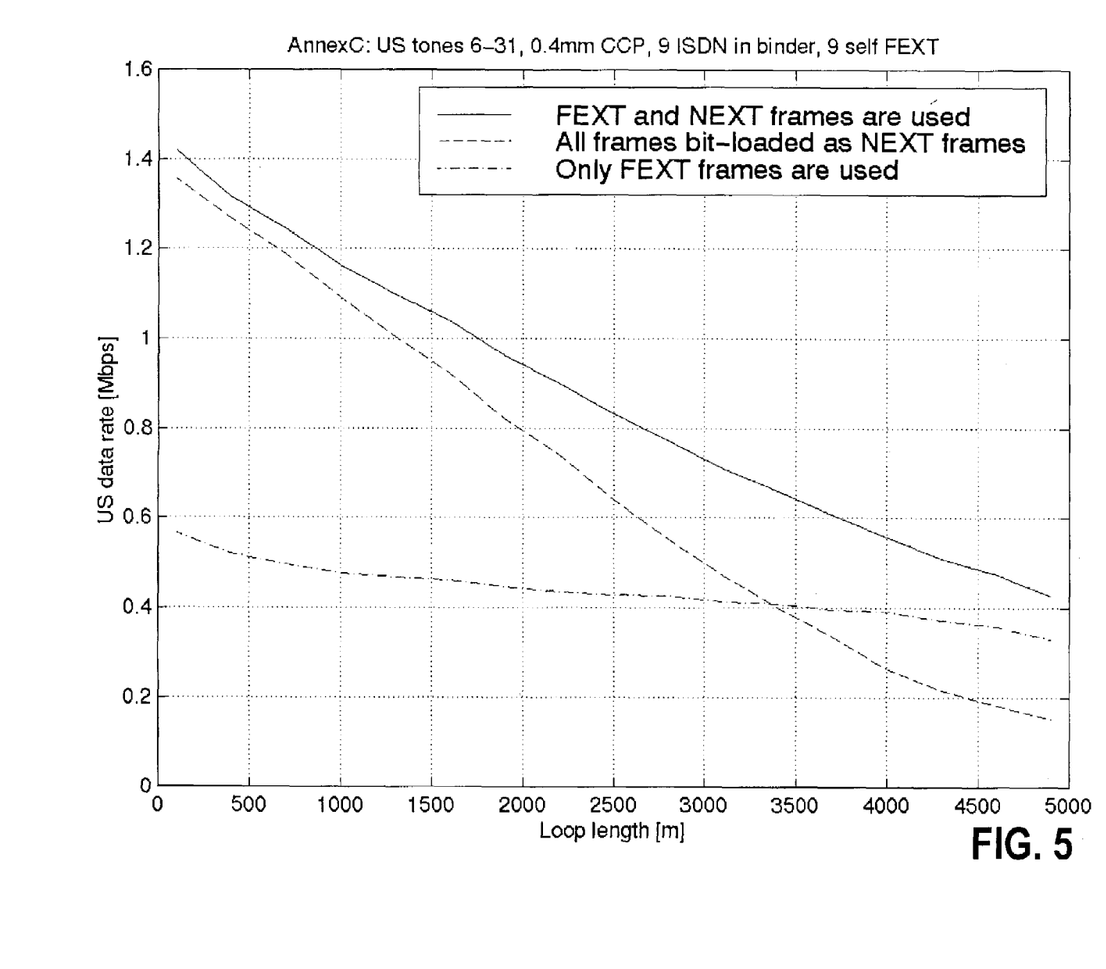
FIG. 5 is a graph showing relative data rates of different uplink communication modes on the time-varying noise channel.

FIGS. 4 and 5 compare performance simulations for the single mode, dual mode, and FEXT-only mode. These simulations were done considering only a single number of carriers, namely, 256 (ADSL). FIG. 4 shows the performance of a modem transmitting from the central office (downstream), and FIG. 5 shows the performance of a modem transmitting from the customer (upstream). The following assumptions were used for the simulations:

| | |
|---|---|
| Downstream band | carriers 36-255 |
| Dwnstream Transmit PSD Mask | −40 dBm/Hz constant |
| Upstream band | carriers 6-31 |
| Upstream Transmit PSD Mask | −38 dBm/Hz constant |
| Coding gain | 3 dB |
| Margin | 6 dB |
| Allowed range of bits/carrier | 1-15 |

The assumed noise environment assumed 9 TCM-ISDN FEXT and NEXT interferers in the same binder, and 9 ADSL FEXT disturbers (no NEXT disturbers due to frequency division duplex operation). The downstream receiver experienced −140 dBm/Hz of additive white Gaussian noise, and the upstream receiver experienced −123 dBm/Hz of additive white Gaussian noise.

The NEXT- and FEXT-interference models used for the simulations are as follows:

$$PSD_{FEXT} = PSD_{DISTURBER} \times |H(f)|^2 \times 10^{-\frac{X_{FEXT}}{10}} \times \left(\frac{l}{l_0}\right) \times \left(\frac{f}{f_0}\right)^2 \quad (6)$$

$$PSD_{NEXT} = PSD_{DISTURBER} \times 10^{-\frac{X_{NEXT}}{10}} \times \left(\frac{f}{f_0}\right)^{1.5} \quad (7)$$

where $f_0$=1 MHz, $l_0$=500 m, and $X_{FEXT}$ and $X_{NEXT}$ are the crosstalk coefficients. Cables using color-coded polyethylene (CCP) coatings have $X_{FEXT}$=36.6 dB and $X_{NEXT}$=40.2 dB. Cables using paper coatings (performance not shown in figures) have $X_{FEXT}$=28.6 dB and $X_{NEXT}$=38.0 dB. The figures assume 0.4 mm conductors.

FIGS. 4 and 5 each show 3 curves. The solid curve shows the performance of a modem sing dual mode operation, the dash-dotted curve shows the performance of a modem using FEXT-only mode, and the dashed curve shows the performance of a modem using single mode. In the single mode case, the bit loading for all symbols is performed based on the worst case noise which is usually NEXT-interference for all loop lengths.

The FEXT-only mode demonstrates relatively poor performance for short loop lengths, but converges to the dual mode level of performance at long loop lengths. Conversely, the single mode demonstrates relatively poor performance for long loop lengths, but converges to the dual mode performance for short loop lengths. Hence the preferred modem embodiment performs well at both extremes and suffers only minor degradation relative to the dual mode at intermediate lengths. Since the crossover point is different for upstream and downstream directions, the preferred embodiment further enhances performance by allowing for the use of different modes in upstream and downstream communications.

It is noted that the constants 126, 214 and 340 were chosen as appropriate for the preferred embodiments, but other numbers may prove suitable for different embodiments.

Numerous variations and modifications will become apparent to those skilled in the art once the above disclosure is fully appreciated. It is intended that the following claims be interpreted to embrace all such variations and modifications.

What is claimed is:

1. A method of communicating data across a channel that experiences near-end cross talk (NEXT) interference and far-end cross talk (FEXT) interference in alternate intervals, the method comprising:
   determining $N_F$, a number of bits per symbol usable in a FEXT-only mode of operation;
   determining $N_S$, a number of bits per symbol usable in a single mode of operation;
   determining $N_{F-LO}$, a number of bits per FEXT symbol usable in a reduced-carrier-number mode;
   determining $N_{N-LO}$, a number of bits per NEXT symbol usable in the reduced-carrier number mode;
   combining $N_{F-LO}$ and $N_{N-LO}$ to determine whether a dual mode of operation in the reduced-carrier number mode provides a higher data rate than the data rates available in the FEXT-only mode and single mode; and
   configuring a modem to transmit using the mode having a highest data rate.

2. The method of claim 1, wherein the FEXT-only mode is determined to have a higher data rate if $126N_F>340N_S$.

3. The method of claim 1 wherein NE is determine by:
   characterizing the channel during at least one interval of FEXT interference;
   performing a bit table determination procedure for FEXT symbols; and
   summing table entries to obtain $N_F$.

4. The method of claim 3, wherein $N_S$ is determined by:
   characterizing the channel during at least one interval of NEXT interference;
   performing a bit table determination procedure for NEXT symbols;
   construction a bit table for single mode symbols; and
   summing single mode bit table entries to obtain $N_S$.

5. The method of claim 4, wherein said constructing includes setting each single mode bit table entry equal to the lesser of the corresponding entries in the FEXT symbol bit table and NEXT symbol table.

6. The method of claim 1, further comprising:
   summing entries from the FEXT symbol bit table to obtain $N_E$;
   summing entries from the single mode symbol bit table to obtain $N_S$; and determining whether a higher data rate can be obtained with FEXT-only mode operation or single mode operation.

7. The method of claim 1, further comprising:
   transmitting data using single mode symbols in both the NEXT- and FEXT-interference intervals if single mode operation offers a higher data rate than FEXT-only mode operation and;
   transmitting data using FEXT-only mode symbols in only the FEXT-interference intervals if FEXT-only mode operation offers a higher data rate than single mode operation.

8. A method as defined in claim 1, wherein the reduced-carrier-number mode comprises an ADSL mode of operation, and the FEXT-only mode comprises an ADSL+ mode of operation.

9. A method of communicating data between a first modem and a second modem via a channel that experiences near-end cross talk (NEXT) interference and far-end cross talk (FEXT) interference in alternate intervals, the method comprising:
   said first modem determining a first preferred communication mode from a mode set, wherein the mode set consists of single mode, FEXT-only mode, and reduced-carrier-number dual mode;
   said second modem determining a second preferred communication mode from said mode set;
   said first modem transmitting data using said second preferred communication mode; and
   said second modem transmitting data using said first preferred communication mode.

10. The method of claim 9, wherein said first and second preferred communication modes are different.

11. The method of claim 9, wherein determining said first and second preferred communication modes includes:
   determining $N_F$, a number of bits per symbol usable in a FEXT-only mode of operation;
   determining $N_S$, a number of bits per symbol usable in a single mode of operation;
   determining whether the FEXT-only mode or the single mode provides a higher data rate; and
   determining the preferred communication mode to be the mode having a higher data rate.

12. The method of claim 11, wherein the FEXT-only mode is determined to be the preferred communication mode if $126N_F>340N_S$.

13. The method of claim 11, where NE is determined by:

analyzing the channel during at least one interval of FEXT interference;
performing a bit table determination procedure for FEXT symbols; and
summing table entries to obtain $N_F$.

14. The method of claim 13, wherein $N_S$ is determined by:
analyzing the channel during at least one interval of NEXT interference;
performing a bit table determination procedure for NEXT symbols;
constructing a bit table for single mode symbols; and
summing single mode bit table entries to obtain $N_S$.

15. The method of claim 14, wherein said constructing includes setting each single mode bit table entry equal to the lesser of the corresponding entries in the FEXT symbol bit table and NEXT symbol bit table.

16. The method of claim 9, wherein determining said first and second preferred communication modes includes:
determining $N_F$, a number of bits per symbol usable in a FEXT-only mode of operation;
determining $N_S$, a number of bits per symbols usable in a single mode of operation;
determining $N_{F-LO}$, a number of bits per FEXT symbol usable in a reduced-carrier-number mode;
determining $N_{N-LO}$, a number of bits per NEXT symbol usable in the reduced-carrier-number mode;
determining whether the FEXT-only mode, the single mode, or the reduced-carrier-number mode provides a higher data rate; and
determining the preferred communication mode to be the mode having a higher data rate.

17. A modem that comprises:
a processor configured to couple to a channel to transmit and receive data via the channel, wherein the channel experiences alternate intervals of near-end cross talk (NEXT) and far-end cross talk (FEXT); and
a memory coupled to the processor, and configured to store a single bit table;
wherein the processor determines a communication mode from a mode set consisting of single mode, FEXT-only mode, and reduced-carrier-number dual mode, and further determines a number of bits per symbol usable in each mode of the mode set,
wherein the processor determines which of the modes is a higher data rate mode, and
wherein the processor stores the bit table for the higher data rate mode in the memory.

18. The modem of claim 17, wherein to determine the number of bits per symbol in FEXT-only mode and single mode, the processor determines a FEXT symbol bit table and determines a single mode symbol bit table.

19. The modem of claim 18, wherein to determine the single mode symbol bit table, the processor determines a NEXT symbol bit table.

20. The modem of claim 19, wherein the processor determines entries in the single mode symbol bit table by taking a lesser of corresponding entries in the FEXT symbol bit table and the NEXT symbol bit table.

21. The modem of claim 17, wherein the processor determines the FEXT-only mode is the higher data rate mode if $126N_F > 340N_S$, where $N_F$ is the number of bits per symbol usable in FEXT-only mode, and $N_S$ is the number of bits per symbol usable in single mode.

22. The modem of claim 17, wherein the FEXT-only mode comprises a first number of carriers, and the reduced-carrier-number dual modem comprises a second number of carriers, the second number of carriers less than the first number of carriers.

23. The modem of claim 17, wherein the reduced-carrier-number mode comprises an ADSL mode of operation, the FEXT-only mode comprises an ADSL+ mode of operation, and the single mode comprises the ADSL+ mode of operation.

* * * * *